US012779885B2

(12) United States Patent
Murata

(10) Patent No.: US 12,779,885 B2
(45) Date of Patent: Nov. 3, 2026

(54) DROPLET EJECTION DEVICE AND ADJUSTMENT METHOD FOR MULTI-NOZZLE HEAD

(71) Applicant: SIJTechnology, Inc., Tsukuba (JP)

(72) Inventor: Kazuhiro Murata, Tsukuba (JP)

(73) Assignee: SIJTechnology, Inc., Tsukuba (JP)

( * ) Notice: Subject to any disclaimer, the term of this patent is extended or adjusted under 35 U.S.C. 154(b) by 129 days.

(21) Appl. No.: 18/894,652

(22) Filed: Sep. 24, 2024

(65) Prior Publication Data

US 2025/0010642 A1 Jan. 9, 2025

Related U.S. Application Data

(63) Continuation of application No. PCT/JP2023/006483, filed on Feb. 22, 2023.

(30) Foreign Application Priority Data

Apr. 21, 2022 (JP) ................................ 2022-069860

(51) Int. Cl.

| | |
|---|---|
| ***B41J 25/316*** | (2006.01) |
| ***B41J 2/045*** | (2006.01) |
| ***B41J 25/34*** | (2006.01) |
| ***B41J 29/393*** | (2006.01) |

(52) U.S. Cl.

CPC ......... *B41J 25/316* (2013.01); *B41J 2/04576* (2013.01); *B41J 25/34* (2013.01); *B41J 29/393* (2013.01); *B41J 2202/14* (2013.01)

(58) Field of Classification Search

CPC ...... B41J 25/316; B41J 2/04576; B41J 25/34; B41J 29/393; B41J 2202/14

See application file for complete search history.

(56) References Cited

U.S. PATENT DOCUMENTS

| | | | |
|---|---|---|---|
| 2007/0197119 | A1 | 8/2007 | Iwata |
| 2010/0045182 | A1 | 2/2010 | Kim |
| 2012/0229552 | A1 | 9/2012 | Sugahara |
| 2012/0249643 | A1 | 10/2012 | Kawagoe |

(Continued)

FOREIGN PATENT DOCUMENTS

| | | | |
|---|---|---|---|
| JP | H1034967 | A | 2/1998 |
| JP | 2001088307 | A | 4/2001 |

(Continued)

OTHER PUBLICATIONS

Extended European Search Report (EESR) dated May 16, 2025 from EP Application No. 23791520.2 (11 pages).

(Continued)

*Primary Examiner* — Sharon Polk

(74) *Attorney, Agent, or Firm* — Quarles & Brady, LLP

(57) ABSTRACT

A droplet ejection device includes an ink supply unit configured to supply ink, a replaceable multi-nozzle head arranged away from the ink supply unit and having a plurality of droplet ejection nozzles configured to eject droplets including the ink by an electrostatic ejection method, a mounting unit configured to mount the multi-nozzle head, an inspection unit configured to inspect an inclination of the multi-nozzle head mounted on the mounting unit, and, an adjusting unit configured to adjust the inclination of the multi-nozzle head based on an inspection result of the multi-nozzle head.

11 Claims, 14 Drawing Sheets

(56) References Cited

U.S. PATENT DOCUMENTS

| | | | |
|---|---|---|---|
| 2013/0027458 A1 | 1/2013 | Sirringhaus et al. | |
| 2016/0347098 A1 | 12/2016 | Von Essen et al. | |
| 2022/0212466 A1 | 7/2022 | Murata | |

FOREIGN PATENT DOCUMENTS

| | | | | | |
|---|---|---|---|---|---|
| JP | 3096490 U | | 9/2003 | | |
| JP | 2004146604 A | * | 5/2004 | | |
| JP | 2005096210 A | | 4/2005 | | |
| JP | 2009220452 A | | 10/2009 | | |
| JP | 2010515932 A | | 5/2010 | | |
| JP | 2012187856 A | | 10/2012 | | |
| JP | 2012213856 A | | 11/2012 | | |
| JP | 2021059015 A | | 4/2021 | | |
| JP | 2022014744 A | | 1/2022 | | |
| WO | 2007145112 A1 | | 12/2007 | | |
| WO | WO-2008080023 A1 | * | 7/2008 | ............ | B41J 25/003 |

OTHER PUBLICATIONS

English translation of Written Opinion of PCT/JP2023/006483 mailed Apr. 25, 2023 (4 pages).

Japan Patent Office, Notice of Reasons for Refusal, Application No. 2022-069860, Dec. 9, 2025, 8 pages.

International Search Report of PCT/JP2023/006483 mailed Apr. 25, 2023 (5 pages).

International Written Opinion of PCT/JP2023/006483 mailed Apr. 25, 2023 (4 pages).

Office Action dated Apr. 10, 2026 issued in Taiwan Application No. 112108851 (10 pages).

Office Action dated Mar. 18, 2026 issued in KR Appl. No. 10-2024-7024642 (11 pages).

Notice of Allowance dated May 19, 2026 issued in Japanese Application No. 2022-069860.

* cited by examiner

Y = 0.3 (-0.1 degree)

Line width = 81.9 μm

Line width= 67.8 μm

DROPLET EJECTION DEVICE AND ADJUSTMENT METHOD FOR MULTI-NOZZLE HEAD

CROSS-REFERENCE TO RELATED APPLICATIONS

This application is a Continuation of International Patent Application No. PCT/JP2023/006483, filed on Feb. 22, 2023, which claims the benefit of priority to Japanese Patent Application No. 2022-069860, filed on Apr. 21, 2022, the entire contents of which are incorporated herein by reference.

FIELD

The present invention relates to a droplet ejection device and an adjustment method for a multi-nozzle head.

BACKGROUND

In recent years, application of inkjet printing technology to industrial processes has been carried out. A color filter manufacturing process for a liquid crystal display is an example. Conventionally, although a so-called piezo type head that ejects droplets by mechanical pressure or vibration has been widely used as an inkjet printing technique, an electrostatic ejection type inkjet head that can eject finer droplets has attracted attention. Japanese Laid-Open Patent Publication No. H10-34967 discloses an electrostatic ejection type inkjet recording device.

SUMMARY

According to an embodiment of the present invention, a droplet ejection device is provided including an ink supply unit configured to supply ink, a replaceable multi-nozzle head arranged away from the ink supply unit and having a plurality of droplet ejection nozzles configured to eject droplets including the ink by an electrostatic ejection method, a mounting unit configured to mount the multi-nozzle head, an inspection unit configured to inspect an inclination of the multi-nozzle head mounted on the mounting unit, and an adjusting unit configured to adjust the inclination of the multi-nozzle head based on an inspection result of the multi-nozzle head.

In the droplet ejection device, the inspection unit may inspect an inclination of tips of the plurality of droplet ejection nozzles adjacent to each other among the multi-nozzle head, and the adjusting unit adjusts the inclination of the tips of the plurality of droplet ejection nozzles.

In the droplet ejection device, the adjusting unit includes a first adjusting unit configured to rotate the multi-nozzle head with respect to a first rotation shaft corresponding to a first direction parallel to an object, a second adjusting unit configured to rotate the multi-nozzle head with respect to a second rotation shaft corresponding to a second direction parallel to the object and intersecting the first direction, and a third adjusting unit configured to rotate the multi-nozzle head with respect to a third rotation shaft corresponding to a third direction perpendicular to the object and intersecting the first direction and the second direction.

In the droplet ejection device, the adjusting unit may rotate the multi-nozzle head with respect to the third rotation shaft so that a line width of a pattern formed when droplets are ejected in a direction in which a plurality of droplet ejection nozzles are arranged satisfies a predetermined condition.

The droplet ejection device may include an operation unit operable by a user, and the adjusting unit rotates the multi-nozzle head with respect to at least one of the first rotation shaft, the second rotation shaft, and the third rotation shaft based on information input from the operation unit.

In the droplet ejection device, the droplet ejection device may include a display unit configured to display information of the inspected multi-nozzle head, and the display unit may display information indicating that adjustment of an inclination of the multi-nozzle head is completed when a predetermined condition between first information of the inspected multi-nozzle head and second information registered in advance is satisfied.

In the droplet ejection device, the display unit may display replacement request information for requesting replacement of the multi-nozzle head when the droplet ejection nozzle of the multi-nozzle head satisfies a predetermined replacement condition.

According to an embodiment of the present invention, a droplet ejection device is provided including an ink supply unit for supplying ink, a mounting unit configured to mount a replaceable multi-nozzle head having a plurality of droplet ejection nozzles arranged away from the ink supply unit, the plurality of droplet ejection nozzles ejecting droplets including the ink by an electrostatic ejection method, an inspection unit configured to inspect an inclination of the multi-nozzle head mounted on the mounting unit, and an adjusting unit configured to adjust an inclination of the multi-nozzle head based on an inspection result of the multi-nozzle head.

According to an embodiment of the present invention, an adjustment method for a multi-nozzle head is provided, the method including, providing a replaceable multi-nozzle head arranged away from an ink supply unit configured to supply ink, the multi-nozzle head having a plurality of droplet ejection nozzles configured to eject droplets by an electrostatic ejection method, inspecting an inclination of the multi-nozzle head when the multi-nozzle head is mounted on the mounting unit, and adjusting the inclination of the multi-nozzle head based on an inspection result of the multi-nozzle head.

The method for adjusting the multi-nozzle head by the droplet ejection device may include inspecting an inclination of tips of the plurality of adjacent droplet ejection nozzles, and adjusting the inclination of the tips of the plurality of droplet ejection nozzles.

The method for adjusting the multi-nozzle head by the droplet ejection device may include rotating the multi-nozzle head with respect to a first rotation shaft corresponding to a first direction parallel to an object, rotating the multi-nozzle head with respect to a second rotation shaft corresponding to a second direction parallel to the object and intersecting the first direction, and rotating the multi-nozzle head with respect to a third rotation shaft corresponding to a third direction perpendicular to the object and intersecting the first direction and the second direction.

The adjustment method for the multi-nozzle head may include rotating the multi-nozzle head by the droplet ejection device with respect to a first rotation shaft corresponding to a first direction parallel to an object, rotating the multi-nozzle head with respect to a second rotation shaft corresponding to a second direction parallel to the object and intersecting the first direction, and rotating the multi-nozzle head with respect to a third rotation shaft corresponding to a third direction perpendicular to the object and intersecting the first direction and the second direction.

The adjustment method for the multi-nozzle head may include rotating the multi-nozzle head by the droplet ejection device with respect to the third rotation shaft so that a line width of a pattern formed when the droplets are ejected in a direction in which the plurality of droplet ejection nozzles are arranged satisfies a predetermined condition.

The adjustment method for multi-nozzle head may include displaying first information of the inspected multi-nozzle head on a display unit by the droplet ejection device, and displaying information indicating that adjustment of an inclination of the multi-nozzle head is completed on the display unit when a predetermined condition between the first information of the inspected multi-nozzle head and second information registered in advance is satisfied.

The adjustment method for multi-nozzle head may include displaying the replacement request information for requesting replacement of the multi-nozzle head is displayed on the display unit by the droplet ejection device when the droplet ejection nozzle of the multi-nozzle head satisfies a predetermined replacement condition.

By using an embodiment of the present invention, droplets can be stably ejected using a replaceable multi-nozzle head.

DESCRIPTION OF EMBODIMENTS

Figure 1:
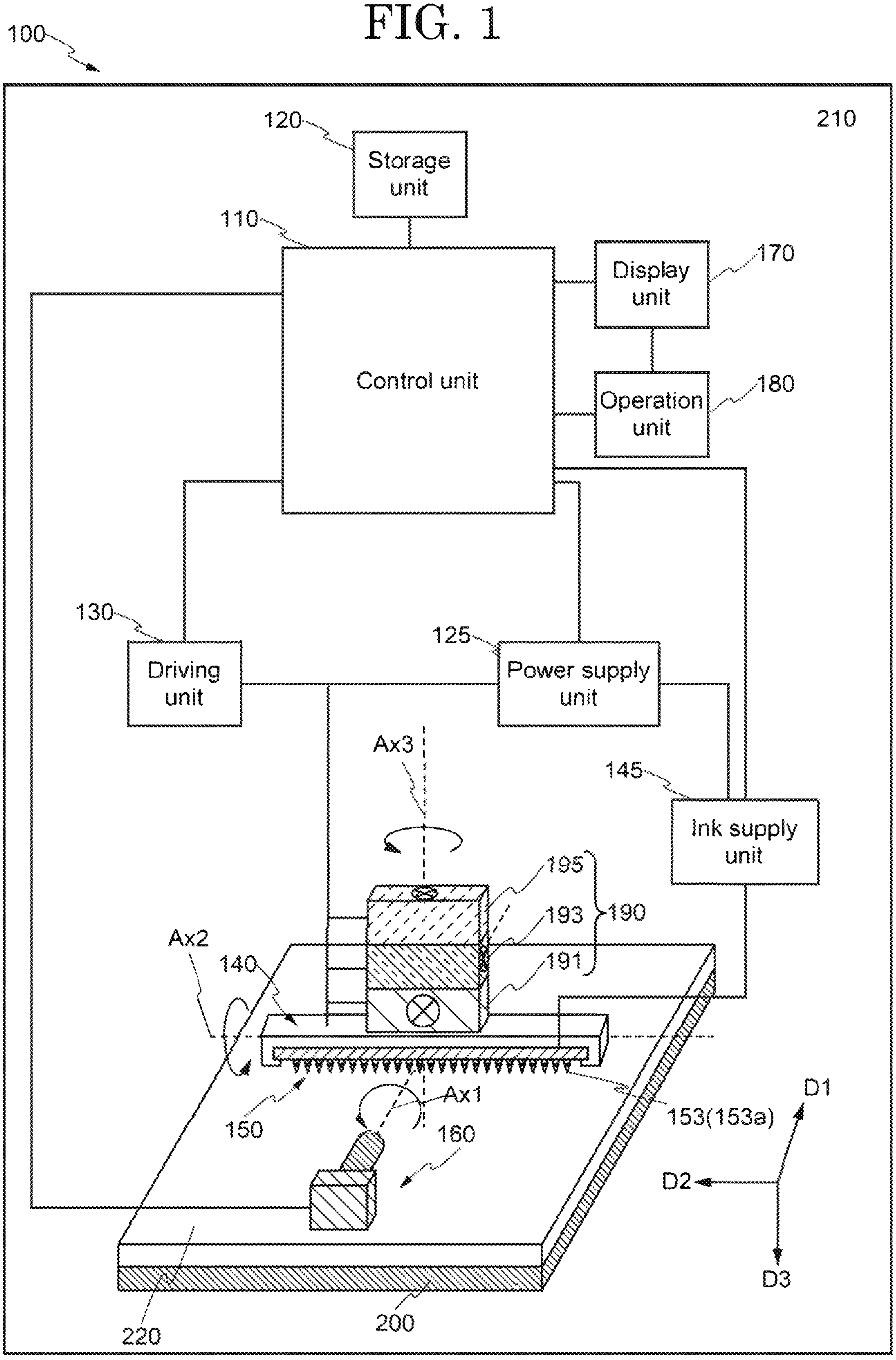
FIG. 1 is a schematic diagram of a droplet ejection device according to an embodiment of the present invention.

Hereinafter, embodiments of inventions disclosed in the present application will be described with reference to the drawings. However, the present invention can be implemented in various forms without departing from the gist thereof, and is not to be construed as being limited to the description of the embodiments exemplified below.

In addition, in the drawings referred to in the present embodiment, the same or similar parts are denoted by the same reference signs or similar reference signs (only denoted by A, B, or the like after the numerals), and repeated description thereof may be omitted. In addition, the dimensional ratios in the drawings may be different from actual ratios for convenience of explanation, or a part of the configuration may be omitted from the drawings.

Further, in the detailed description of the present invention, when defining an inclination relationship between one component and another, the terms "above" and "below" include not only a case where the component is inclined directly above or directly below, but also a case where another component is interposed therebetween unless otherwise specified.

In recent years, for an electrostatic ejection type inkjet head, a multi-nozzle head having a plurality of nozzles has been developed from the viewpoint of improving productivity. When droplets are ejected from the multi-nozzle, the droplets can be ejected so as to have various patterns by changing an arrangement of the nozzles.

On the other hand, a user needs to replace the multi-nozzle head according to the pattern to be formed. An angle formed by an arrangement direction of the nozzles of the multi-nozzle head and a movement direction of a stage needs to be adjusted so as to be constant at all times even in the case where a different multi-nozzle head of the same specifications is mounted. If the multi-nozzle head is not installed at an optimum position, a pattern with a desired accuracy cannot be formed.

Therefore, the present disclosure discloses to stably eject droplets using a replaceable multi-nozzle head.

First Embodiment

[1-1. Configuration of Droplet Ejection Device 100]

FIG. 1 is a schematic diagram of a droplet ejection device 100 according to an embodiment of the present invention.

The droplet ejection device 100 includes a control unit 110, a storage unit 120, a power supply unit 125, a driving unit 130, a mounting unit 140, a multi-nozzle head 150, an inspection unit 160, a display unit 170, an operation unit 180, an adjusting unit 190, an object holding unit 200, and a housing 210. The control unit 110, the storage unit 120, the power supply unit 125, the driving unit 130, the mounting unit 140, an ink supply unit 145, the multi-nozzle head 150, the inspection unit 160, the display unit 170, the operation unit 180, the adjusting unit 190, and the object holding unit 200 are electrically connected by a wiring bus and are arranged inside the housing 210.

The control unit 110 includes a CPU (Central Processing Unit), an ASIC (Application Specific Integrated Circuit), an FPGA (Field Programmable Gate Array), or another arithmetic processor. The control unit 110 controls droplet ejection processing by the multi-nozzle head 150 using a droplet ejection program set in advance. Further, the control unit 110 controls an inclination of the multi-nozzle head 150.

The storage unit 120 has a function as the droplet ejection program and a database for storing various kinds of information used in the droplet ejection program. As the storage unit 120, a memory, an SSD, or a storage-capable device are used. Further, the storage unit 120 stores inclination information (also referred to as parallelism) of the multi-nozzle head 150.

The power supply unit 125 applies a voltage to the multi-nozzle head 150 based on a signal input from the control unit 110. In this example, the power supply unit 125 applies a pulsed voltage (in this example, 1000 V) to the multi-nozzle head 150. In addition, the voltage is not limited to the pulse voltage, and a constant voltage may be constantly applied.

The driving unit 130 includes a driving member such as a motor, a belt, and a gear. The driving unit 130 moves the multi-nozzle head 150 relative to the object 220 in one direction (in this case, a second direction D2) based on an instruction from the control unit 110.

The mounting unit 140 mounts the multi-nozzle head 150. In this example, the mounting unit 140 is bonded to the plate portion of the nozzle head to mount the nozzle head. In this case, the mounting unit 140 may mount the multi-nozzle head 150 using a jig, an adhesive, or the like.

The ink supply unit 145 (also referred to as an ink tank or an ink cartridge) is arranged away from the mounting unit 140. The ink supply unit 145 stores ink. The ink supply unit 145 supplies the stored ink to the multi-nozzle head 150.

Figure 2A:
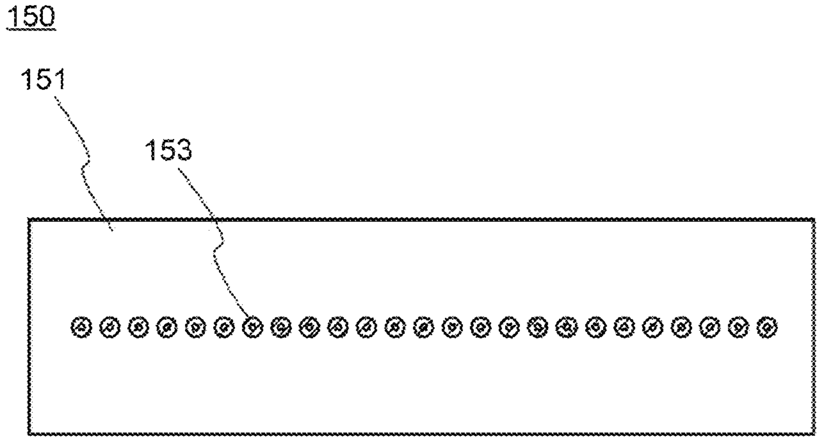
FIG. 2A is a plan view of a multi-nozzle head.
Figure 2B:
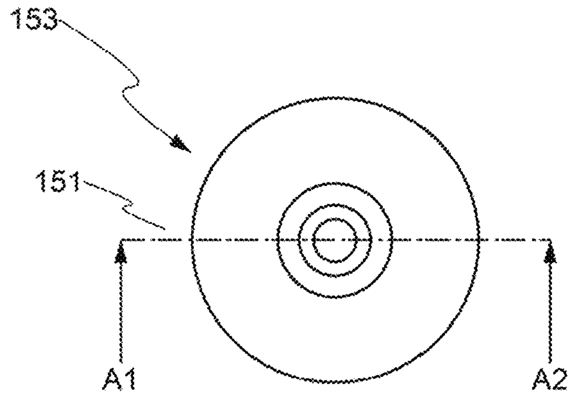
FIG. 2B is an enlarged top view of a droplet ejection nozzle.
Figure 2C:
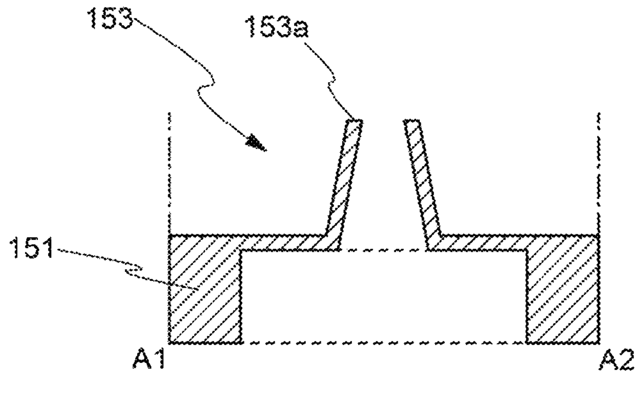
FIG. 2C is an enlarged cross-sectional view of a droplet ejection nozzle.

The multi-nozzle head 150 is arranged away from the ink supply unit 145 and the mounting unit 140. FIG. 2A is a plan view of the multi-nozzle head 150. FIG. 2B is an enlarged top view of a droplet ejection nozzle 153. FIG. 2C is an enlarged cross-sectional view of the droplet ejection nozzle 153. As shown in FIG. 2A, the multi-nozzle head 150 includes a plate portion 151 and a plurality of droplet ejection nozzles 153. The plate portion 151 is arranged in a flat shape. The droplet ejection nozzle 153 is arranged in the plate portion 151. An electrostatic ejection type inkjet nozzle is used as the droplet ejection nozzle 153. As shown in FIG. 2B and FIG. 2C, the droplet ejection nozzle 153 is formed to have a shape that tapers toward a tip 153*a*. The multi-nozzle head 150 is also referred to as a multi-nozzle plate. In the present embodiment, liquid held in the ink supply unit 145 by a voltage applied from the power supply unit 125 to the multi-nozzle head 150 is ejected as a droplet from the tip 153*a* of the droplet ejecting nozzle 153 in the multi-nozzle head 150 in a direction (third direction D3) of the object 220.

As shown in FIG. 2A, in the multi-nozzle head 150, the plurality of droplet ejection nozzles 153 are arranged side by side in a row (specifically, in the first direction D1). Note that the plurality of droplet ejection nozzles 153 are not limited to being arranged side by side in a row, and may be arranged side by side in two dimensions (specifically, the first direction D1 and the second direction D2 intersecting the first direction D1) or may be arranged in a scattered manner.

In addition, the multi-nozzle head 150 is arranged so as to be replaceable from the mounting unit 140. As a result, it is possible to use the multi-nozzle head 150 having an appropriate nozzle arrangement according to a pattern to be formed.

The inspection unit 160 inspects the inclination of the multi-nozzle head 150 mounted on the mounting unit 140. In this example, the inspection unit 160 inspects the inclination of the tip 153*a* of the neighboring droplet ejection nozzle 153 in the multi-nozzle head 150. In this case, the inspection unit 160 inspects the inclination of the tip 153*a* of the droplet ejection nozzles 153 arranged in a row with respect to a reference surface. The reference surface may be the object 220 or a preset plane. The inclination of the multi-nozzle head 150 may be defined as parallelism. In this example, an imaging device is used as the inspection unit 160. Specifically, a CCD (Charge Coupled Device) type camera or a CMOS (Complementary Metal Oxide Semiconductor) type of camera is used as the inspection unit 160. Information acquired by the inspection unit 160 is sent to the control unit 110 and the storage unit 120.

The display unit 170 displays control information (text information or image information) under the control of the control unit 110. In this case, the display unit 170 may display the control information via a GUI (Graphical User Interface). Further, the display unit 170 displays the inclination information of the multi-nozzle head 150.

The operation unit 180 includes an operable member. For example, a button, a lever, a numeric keypad, and the like are used for the operation unit 180. Operations such as up, down, left, or right movement, pressing, or rotation, or input of numerical values are performed by using the operation unit 180, and information based on the operations is acquired by the control unit 110. In the case where the display unit 170 has a function of the operation unit 180, the display unit 170 may be used as a touch panel.

The adjusting unit 190 adjusts the inclination of the multi-nozzle head 150. Specifically, the adjusting unit 190 adjusts the inclination of the tip 153*a* of the droplet ejection nozzle 153 of the multi-nozzle head 150.

The adjusting unit 190 includes a first adjusting unit 191, a second adjusting unit 193, and a third adjusting unit 195. The first adjusting unit 191 rotates the multi-nozzle head 150 with respect to a first rotation shaft Ax1. The second adjusting unit 193 rotates the multi-nozzle head 150 with respect to a second rotation shaft Ax2. The third adjusting unit 195 rotates the multi-nozzle head 150 with respect to a third rotation shaft Ax3. The first rotation shaft Ax1, the second rotation shaft Ax2, and the third rotation shaft Ax3 intersect each other. The first rotation shaft Ax1 corresponds to the first direction D1 (a depth direction of the droplet ejection device 100). The second rotation shaft Ax2 corresponds to the second direction D2 (a lateral direction of the droplet ejection device 100). The third rotation shaft Ax3 corresponds to the third direction D3 (a direction perpendicular to the ground). A goniometer stage is used for the first adjusting unit 191 and the second adjusting unit 193. A θ stage is used as the third adjusting unit 195.

The object holding unit 200 has a function of holding the object 220. In this example, a stage is used as the object holding unit 200. A mechanism by which the object holding unit 200 holds the object 220 is not particularly limited, and a general holding mechanism is used. In this example, the object 220 is held to the object holding unit 200 by a vacuum. The object holding unit 200 may hold the object 220 using a fixture.

Figure 3:
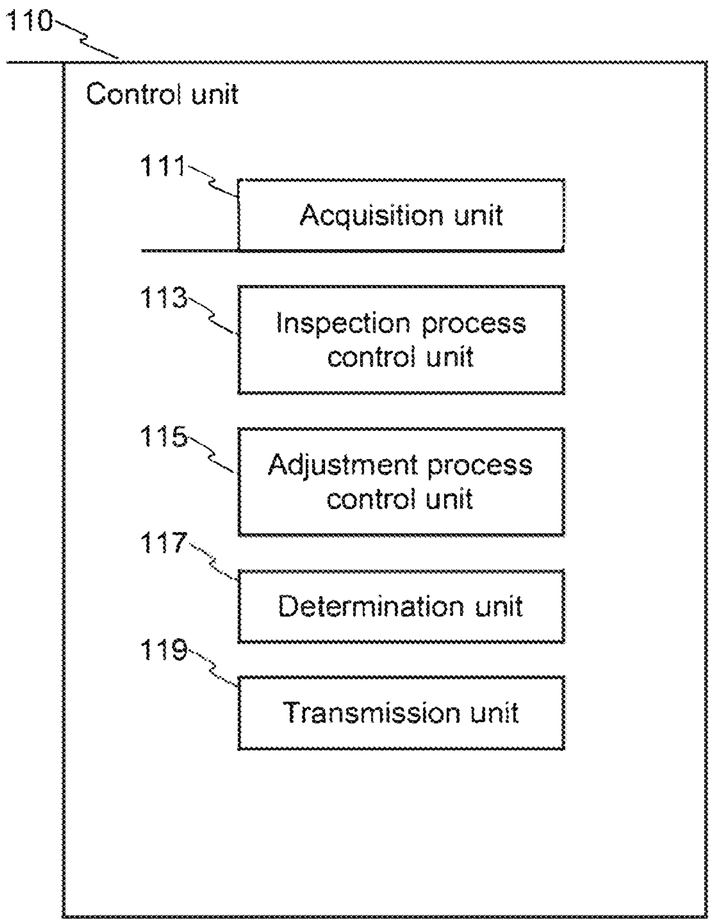
FIG. 3 is a functional block diagram of a control unit of the droplet ejection device according to an embodiment of the present invention.

FIG. 3 is a functional block diagram of the control unit 110. As shown in FIG. 3, the control unit 110 includes an acquisition unit 111, an inspection process control unit 113, an adjustment process control unit 115, a determination unit 117, and a transmission unit 119 as functional units.

The acquisition unit 111 has a function of acquiring information transmitted from each device.

The inspection process control unit 113 has a function of controlling an inspection process performed by the inspection unit 160.

The adjustment process control unit 115 has a function of controlling an adjustment process by the adjusting unit 190.

The determination unit 117 determines whether the inclination of the multi-nozzle head 150 adjusted by the adjusting unit 190 is the correct inclination. Specifically, the inspection unit 160 captures an image of the tip 153*a* of the droplet ejection nozzle 153 of the adjusted multi-nozzle head 150. The determination unit 117 determines whether or not the image of the tip 153*a* of the captured droplet ejection nozzle 153 is the same as an image of the tip 153*a* of the registered droplet ejection nozzle 153.

The transmission unit 119 transmits various types of control information (instruction information) to each device.

[1-2. Adjustment Method for Multi-Nozzle Head]

Figure 4:
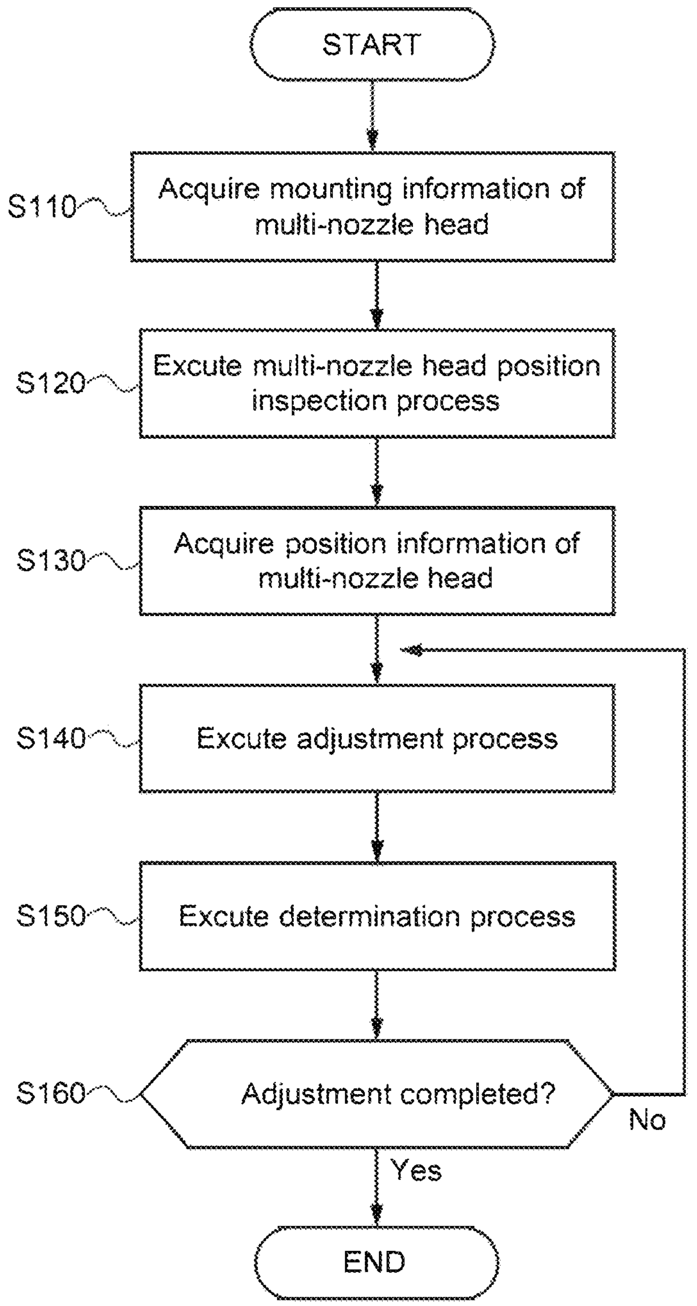
FIG. 4 is an adjustment flow diagram of a multi-nozzle head of a droplet ejection device according to an embodiment of the present invention.

Hereinafter, an adjustment method for the multi-nozzle head 150 in the droplet ejection device will be described with reference to the drawings. FIG. 4 is a flow diagram of the adjustment method for the multi-nozzle head 150 in the droplet ejection device.

First, the user attaches the multi-nozzle head 150 to the mounting unit 140. In this case, the user may input the information that the multi-nozzle head is attached to the mounting unit 140 via the operation unit 180 (for example, by pressing the mounting completion button). Information on which the multi-nozzle head 150 is attached to the mounting unit 140 is transmitted to the acquisition unit 111 of the control unit 110, and the acquisition unit 111 acquires the mounting information of the multi-nozzle head 150 (S110).

Next, the inspection process control unit 113 of the control unit 110 executes the inspection process based on the information on which the multi-nozzle head 150 is attached to the mounting unit 140 (S120). In this case, the inspection process control unit 113 transmits instruction information for inspecting the multi-nozzle head 150 to the inspection unit 160. The inspection unit 160 inspects the multi-nozzle head based on the received instruction information. Specifically, the inspection unit 160 inspects a positional relationship with the tip 153*a* of the neighboring droplet ejection nozzle 153 by imaging the tip 153*a* of the droplet ejection nozzle 153 of the multi-nozzle head 150. The captured image of the tip 153*a* of the droplet ejection nozzle 153 is transmitted to the control unit 110. The transmission unit 119 of the control unit 110 transmits the image of the tip 153*a* of the droplet ejection nozzle 153 to the display unit 170. The display unit 170 displays the captured image of the tip 153*a* of the droplet ejection nozzle 153. In this case, an inclination of the droplet ejection nozzle 153 adjacent to a reference direction (the first direction D1, the second direction D3, or the third direction D3) may be numerically displayed.

On the basis of the image of the tip 153*a* of the droplet ejection nozzle 153 of the multi-nozzle head 150 displayed on the display unit 170, the user may input information for moving the multi-nozzle head 150 via the operation unit 180. The input information is acquired by the acquisition unit 111 of the control unit 110 (S130).

Next, the adjustment process control unit 115 of the control unit 110 executes the adjustment process of the multi-nozzle head 150 based on the input data (S140). In this case, the adjustment process control unit 115 transmits instruction information for adjusting the multi-nozzle head 150 (the tip 153*a* of the droplet ejection nozzle 153) to the adjusting unit 190. The adjusting unit 190 adjusts the inclination of the multi-nozzle head 150 based on the received instruction information. In this case, the inclination includes inclinations of the multi-nozzle head 150 with respect to the first direction D1, the second direction D2, and the third direction D3.

The inspection process control unit 113 may transmit inspection instruction information of the multi-nozzle head 150 to the inspection unit 160 in conjunction with the adjustment process. In this example, the inspection unit 160 captures an image of the tip 153*a* of the droplet ejecting nozzle 153 in the multi-nozzle head 150. The captured images of the tip 153*a* of the droplet ejection nozzle 153 are transmitted to the control unit 110. In this case, the acquisition unit 111 of the control unit 110 acquires the inclination information of the multi-nozzle head 150 after adjustment. The transmission unit 119 of the control unit 110 transmits the inclination information of the multi-nozzle head 150 (image of the tip 153*a* of the droplet ejecting nozzle 153) to the display unit 170. The display unit 170 displays the inclination information of the multi-nozzle head 150 (an image of the tip 153*a* of the captured droplet ejection nozzle 153).

Next, the determination unit 117 of the control unit 110 executes a determination process (S150). Specifically, the determination unit 117 compares the acquired inclination information of the multi-nozzle head 150 after adjustment (an image of the tip 153*a* of the droplet ejection nozzle 153, also referred to as first information) with the inclination information of the multi-nozzle head (an image of the tip 153*a* of the droplet ejection nozzle 153, also referred to as second information) registered in advance. Consequently, in the case where the inclination of the adjusted multi-nozzle head 150 does not match a set inclination (S160; No), the process may be looped back to S140. On the other hand, in the case where the inclination of the adjusted multi-nozzle head 150 matches the set inclination (S160; Yes), the adjustment process is completed. In this case, the control unit 110 transmits instruction information for displaying that an inclination adjustment of the multi-nozzle head 150 has been completed to the display unit 170. In this case, the display unit 170 displays information indicating that the inclination adjustment of the multi-nozzle head 150 is completed, based on the received information.

Figure 5A:
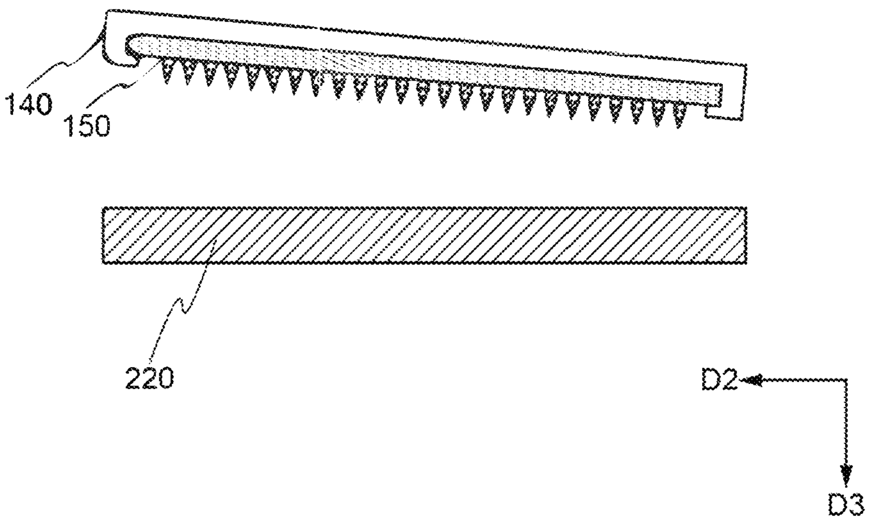
FIG. 5A is a schematic diagram of a multi-nozzle head prior to adjustment.
Figure 5B:
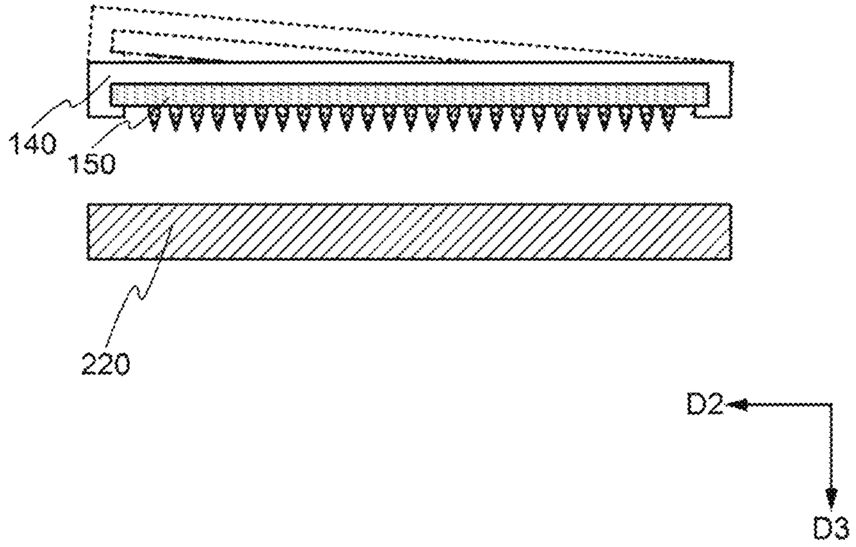
FIG. 5B is a schematic diagram of the multi-nozzle head after adjustment.

FIG. 5A is a schematic view of a multi-nozzle before adjustment. FIG. 5B is a schematic view of the multi-nozzle after adjustment. As shown in FIG. 5A and FIG. 5B, even if the inclination of the multi-nozzle head 150 deviates from a predetermined inclination when the multi-nozzle head 150 is mounted on the mounting unit 140, the inclination of the multi-nozzle head 150 can be adjusted to an appropriate inclination.

It is possible to stably eject droplets even in a case where a replacement process of the multi-nozzle head is performed, which is not performed in the conventional electrostatic ejection type droplet ejection device by using the present embodiment.

Further, it is possible to reduce the influence of defects even in a case where there is a shape defect in the mounting unit 140 by using the present embodiment. Therefore, droplets can be stably ejected.

Second Embodiment

In the present embodiment, a droplet ejection device different from the first embodiment will be described. Specifically, an example in which a plurality of inspection units are provided will be described. Note that, for the sake of explanation, members will be omitted as appropriate.

Figure 6:
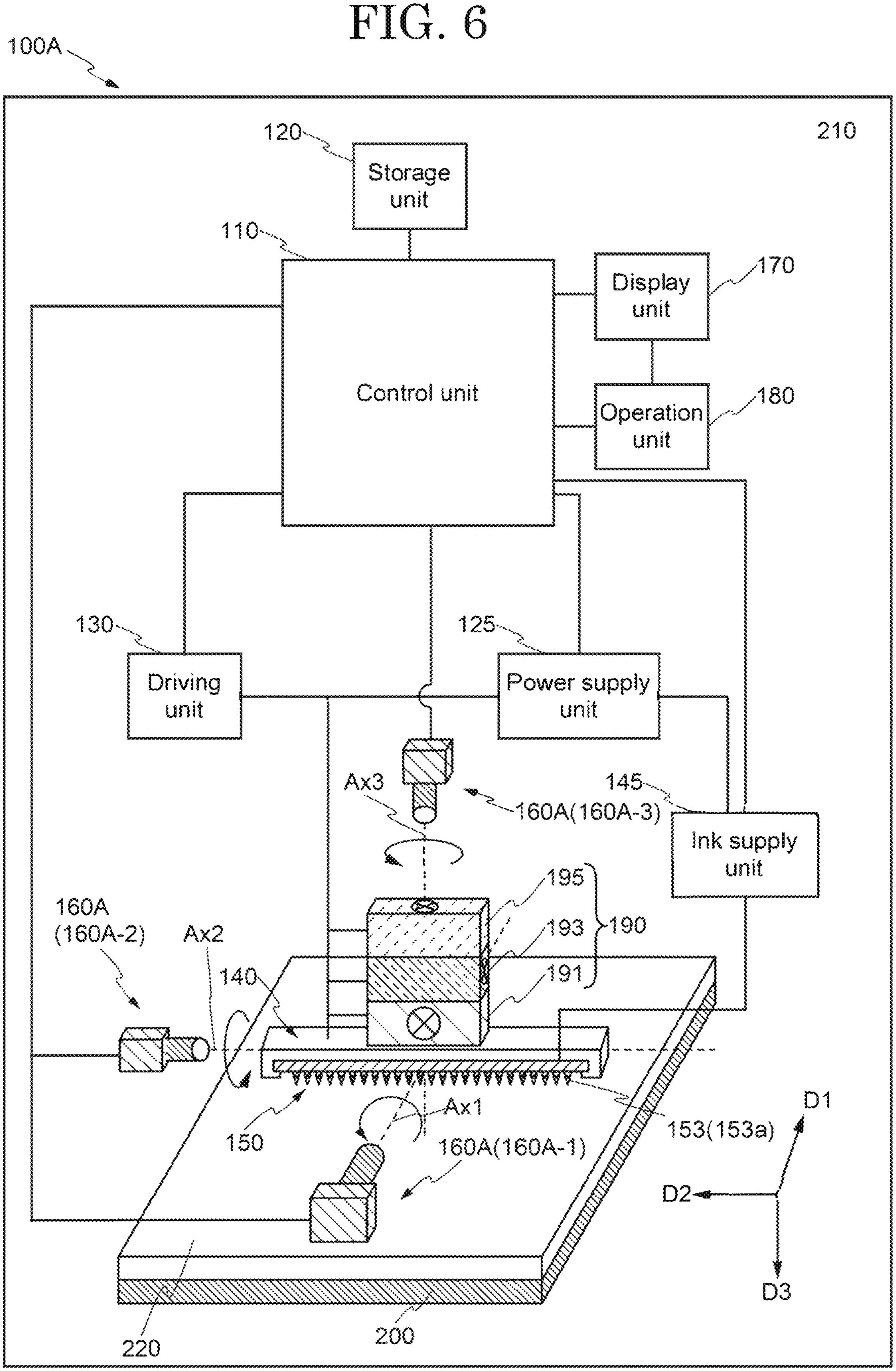
FIG. 6 is a schematic diagram of a droplet ejection device according to an embodiment of the present invention.

FIG. 6 is a schematic diagram of a droplet ejection device 100A. As shown in FIG. 6, the droplet ejection device 100A includes the control unit 110, the storage unit 120, the power supply unit 125, the driving unit 130, the mounting unit 140, the ink supply unit 145, the multi-nozzle head 150, an inspection unit 160A, the display unit 170, the operation unit 180, the adjusting unit 190, the object holding unit 200, and the housing 210.

As shown in FIG. 6, the inspection unit 160A includes a plurality of inspection units in the present embodiment. Specifically, an inspection unit 160A-1 is provided corresponding to the first direction D1 of the multi-nozzle head 150. An inspection unit 160A-2 is provided corresponding to the second direction D2 of the multi-nozzle head 150. An inspection unit 160A-3 is provided corresponding to the third direction D3 of the multi-nozzle head 150.

Figure 7A:
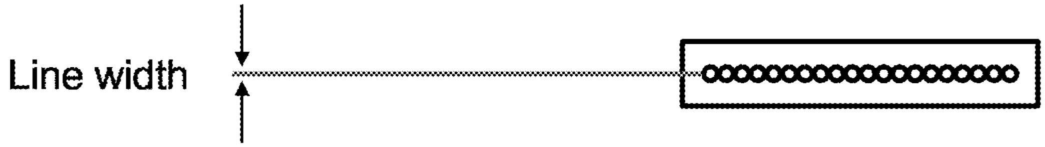
FIG. 7A is a diagram for explaining a direction of ejecting droplets.
Figure 7B:
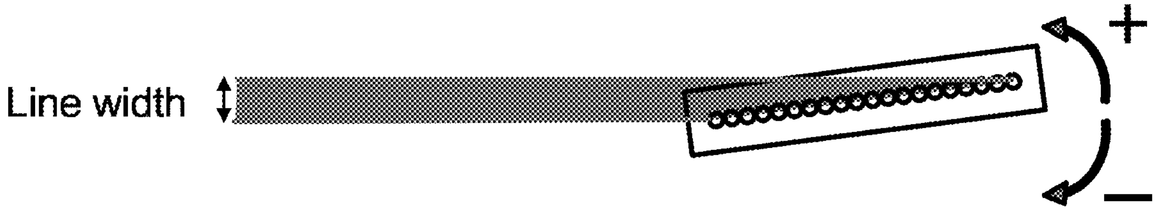
FIG. 7B is a diagram for explaining a direction of ejecting droplets.

Further, in the case of the present embodiment, evaluation may be performed using a pattern formed by ejecting droplets in a direction in which the droplet ejection nozzles 153 are arranged. FIG. 7A and FIG. 7B are diagrams for explaining the direction in which the droplets are ejected. When the droplet ejection nozzle 153 is inclined, a linewidth of the formed pattern increases as shown in FIG. 7B. Therefore, as shown in FIG. 7A, it is desirable to adjust the inclination of the multi-nozzle head 150 with respect to the third direction D3 so as to minimize the linewidth of the pattern formed by the ejected droplets. The linewidth of the pattern is evaluated by the inspection unit 160A-3. An optical microscope, an electronic microscope, or the like may be used as the inspection unit 160A-3. Further, the present invention is not limited to the inspection unit 160A-3, and the linewidth of the pattern may be evaluated using an inspection unit arranged at another location.

Therefore, the inclination (position) of the multi-nozzle head 150 can be adjusted with higher accuracy by using the present embodiment.

Third Embodiment

A droplet ejection device different from the second embodiment will be described in the present embodiment. Specifically, an example in which not only an imaging device but also a laser sensor is provided as an inspection unit will be described. In addition, for the sake of explanation, members will be omitted as appropriate.

Figure 8:
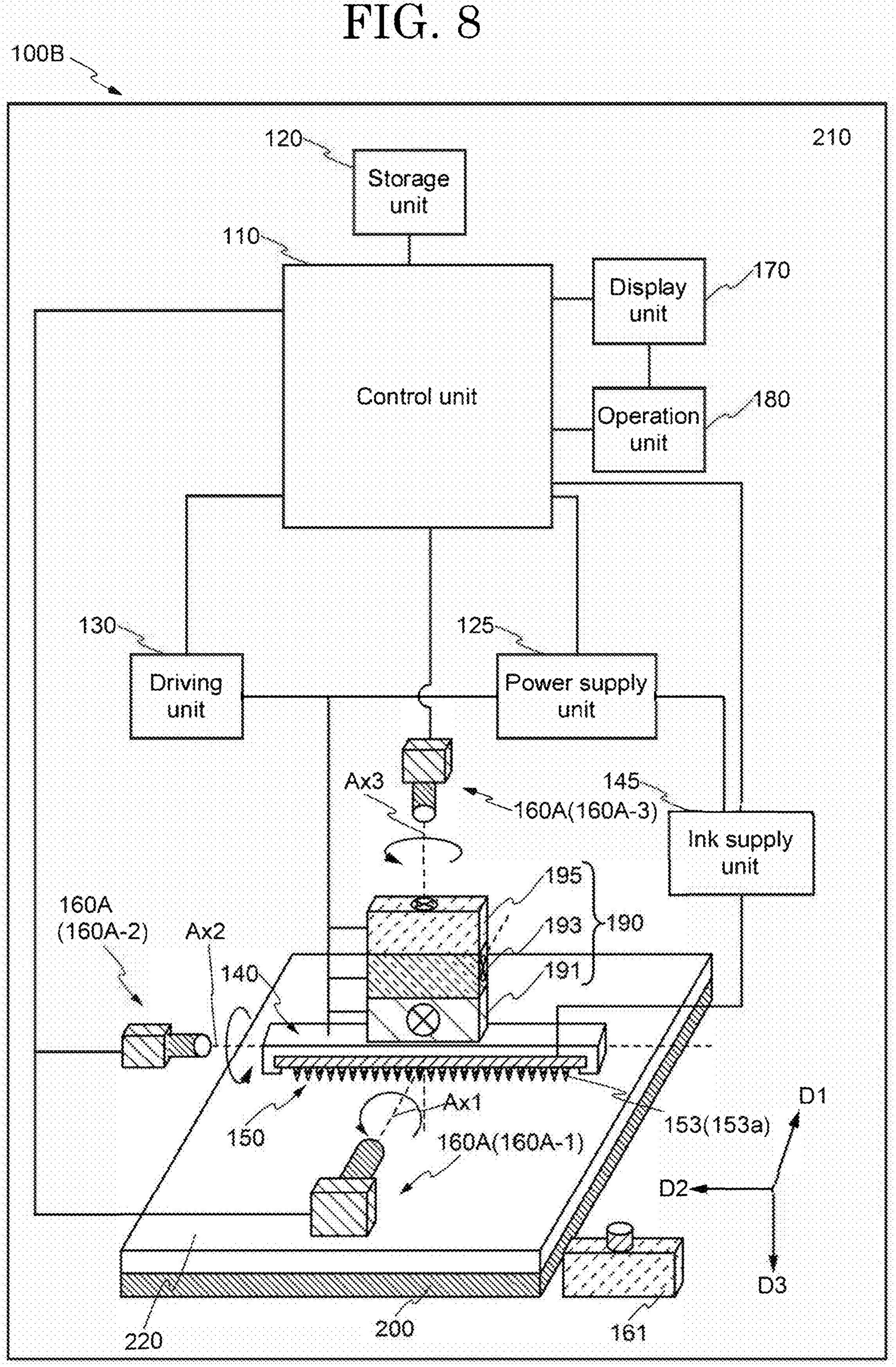
FIG. 8 is a schematic diagram of a droplet ejection device according to an embodiment of the present invention.

FIG. 8 is a schematic diagram of a droplet ejection device 100B. As shown in FIG. 8, the droplet ejection device 100B includes the inspection unit 161 in addition to the control unit 110, the storage unit 120, the power supply unit 125, the driving unit 130, the mounting unit 140, the ink supply unit 145, the multi-nozzle head 150, the inspection unit 160A, the display unit 170, the operation unit 180, the adjusting unit 190, the object holding unit 200, and the housing 210. A laser sensor is used as the inspection unit 161.

Figure 9:
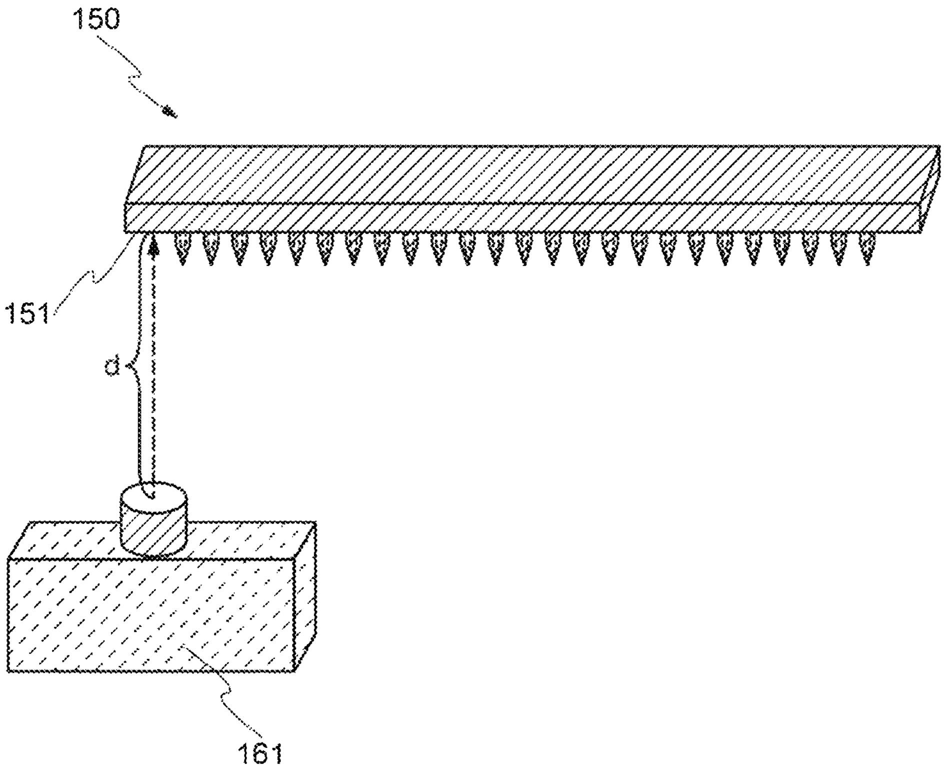
FIG. 9 is a schematic diagram showing a relationship between an inspection unit and a multi-nozzle.

FIG. 9 is a schematic diagram showing a relationship between the inspection unit 161 and the multi-nozzle head 150. The laser irradiation unit of the inspection unit 161 is arranged upward so as to face the multi-nozzle head 150. The inspection unit 161 may measure a distance d between four corners (the plate portion 151) of the multi-nozzle head 150 and the inspection unit 161. The measured value is fed back to the control unit 110. The adjustment process control unit 115 adjusts the inclination of the multi-nozzle head 150 so that the distance d at the four corners is the same. The inclination of the multi-nozzle head 150 with respect to the first direction D1 and the second direction D2 can be adjusted with higher accuracy by using the present embodiment.

EXAMPLES

Hereinafter, an example of an adjustment method of an inclination of a multi-nozzle head will be described.

Figure 10:
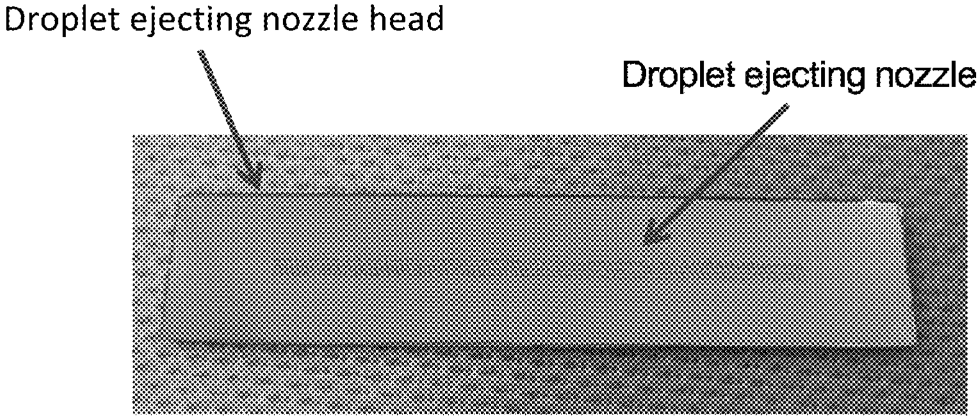
FIG. 10 is a photograph of a multi-nozzle head used in the present embodiment.

FIG. 10 is a photograph of a multi-nozzle head used in the present embodiment. In the present embodiment, the multi-nozzle head is provided with 100×4 rows=400 droplet ejection nozzles.

Figure 11A:
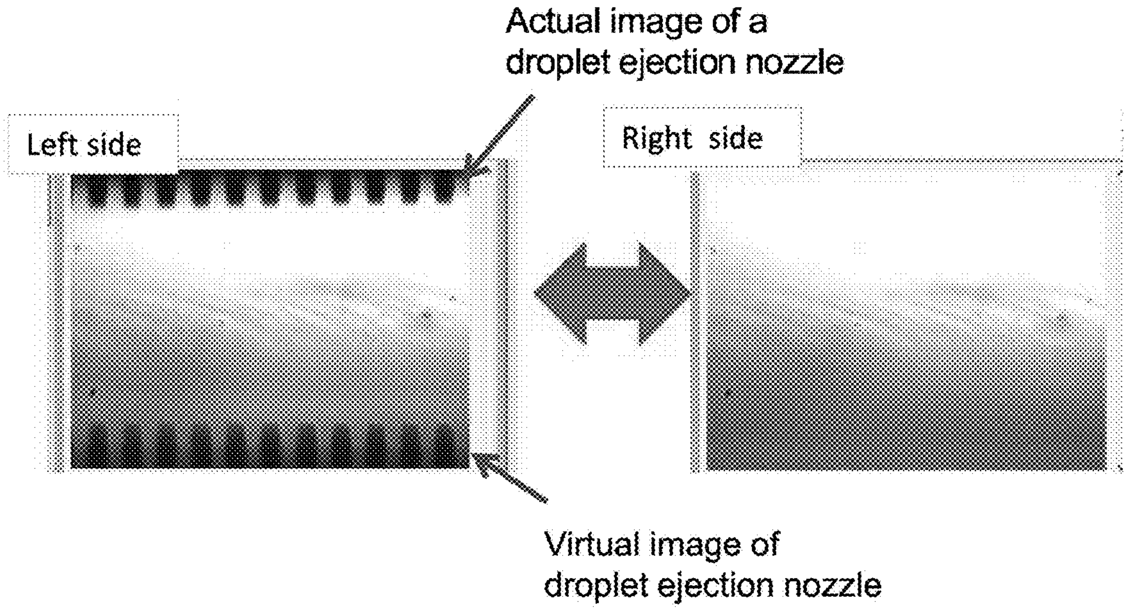
FIG. 11A is a diagram showing an image of a droplet ejection nozzle in a multi-nozzle head according to an embodiment of the present disclosure.
Figure 11B:
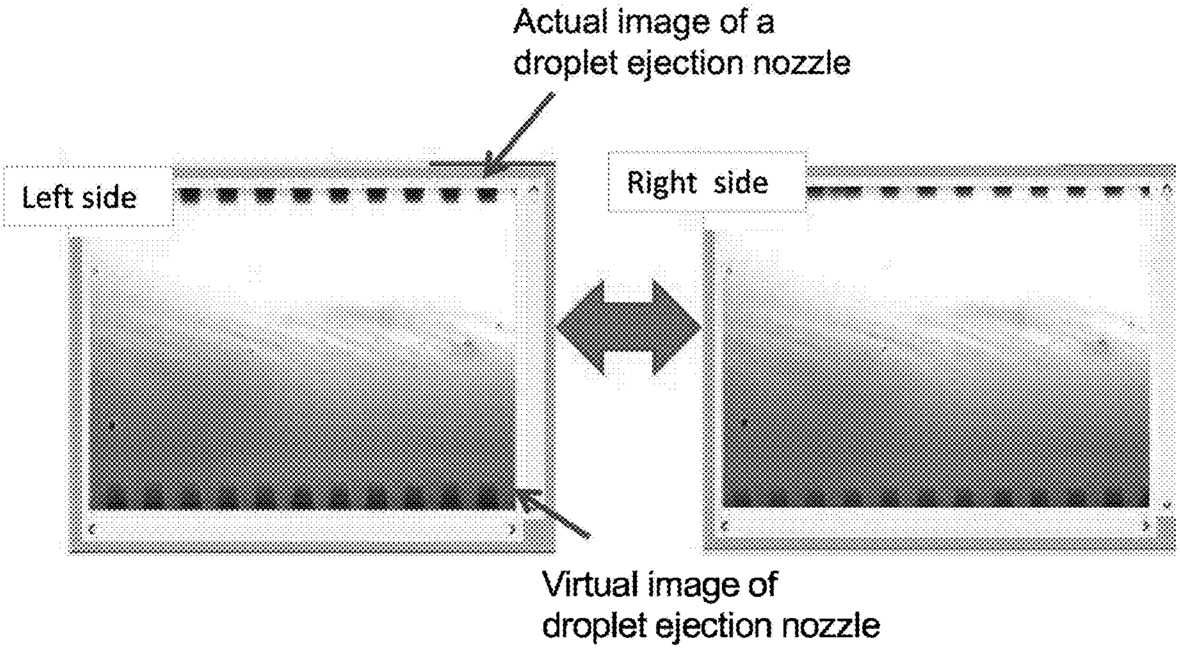
FIG. 11B is a diagram showing an image of a droplet ejection nozzle after adjustment in a multi-nozzle head according to an embodiment of the present disclosure.

FIG. 11A is an image of the multi-nozzle head 150 before adjustment captured by the inspection unit 160. FIG. 11B is an image of the multi-nozzle head 150 after adjustment using the first adjusting unit 191. In this example, a real image of the droplet ejection nozzle is confirmed on the upper side of the screen and a virtual image of the droplet ejection nozzle is confirmed on the lower side of the screen. The first adjusting unit 191 rotates the multi-nozzle head 150 with respect to the first rotation shaft Ax1. As a result, although the droplet ejection nozzles on the right side are not visible in FIG. 11A, the droplet ejection nozzles on the left and right sides can be checked as shown in FIG. 11B.

Figure 12A:
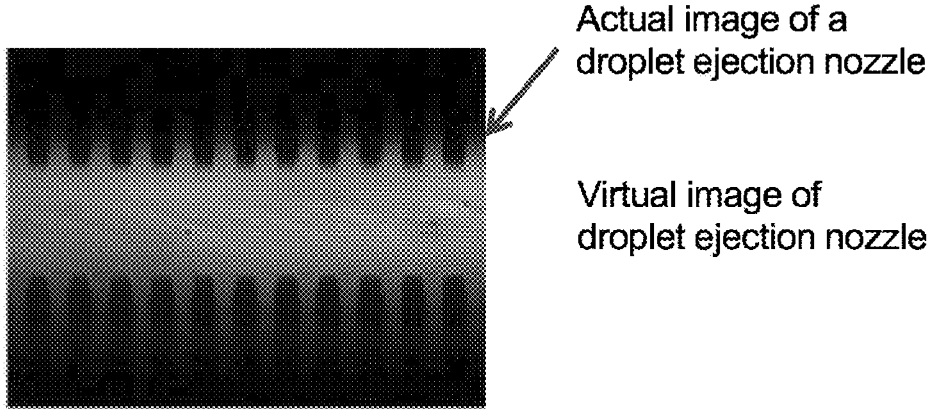
FIG. 12A is a diagram showing an image of a droplet ejection nozzle in a multi-nozzle head according to an embodiment of the present disclosure.
Figure 12B:
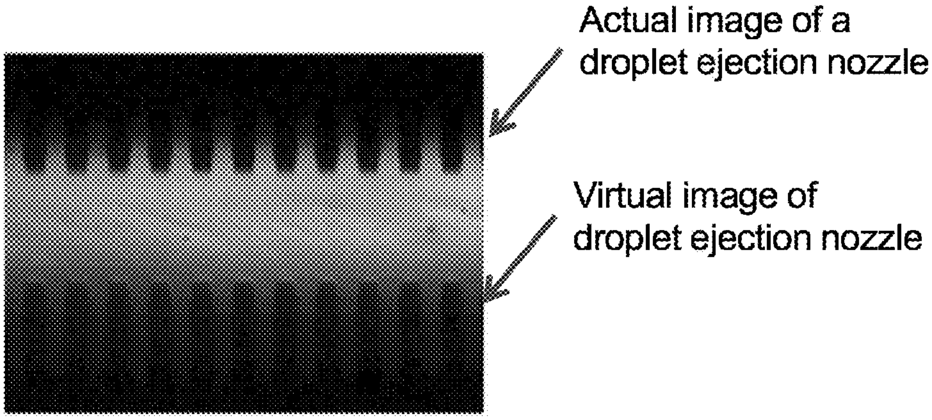
FIG. 12B is a diagram showing an image of a droplet ejection nozzle after adjustment in a multi-nozzle head according to an embodiment of the present disclosure.

FIG. 12A is an image of the multi-nozzle head 150 before adjustment captured by the inspection unit 160. In FIG. 12A, the virtual image side can be confirmed down to the base, while the real image side is slightly confirmed at a tip. FIG. 12B is an image obtained when the inclination of the multi-nozzle head 150 is adjusted using the second adjusting unit 193. The second adjusting unit 193 rotates the multi-nozzle head 150 with respect to the second rotation shaft Ax2. It is possible to confirm the real image and the virtual image in substantially the same manner as shown in FIG. 12B by adjusting the inclination of the multi-nozzle head 150 by the second adjusting unit 193.

Figure 13A:
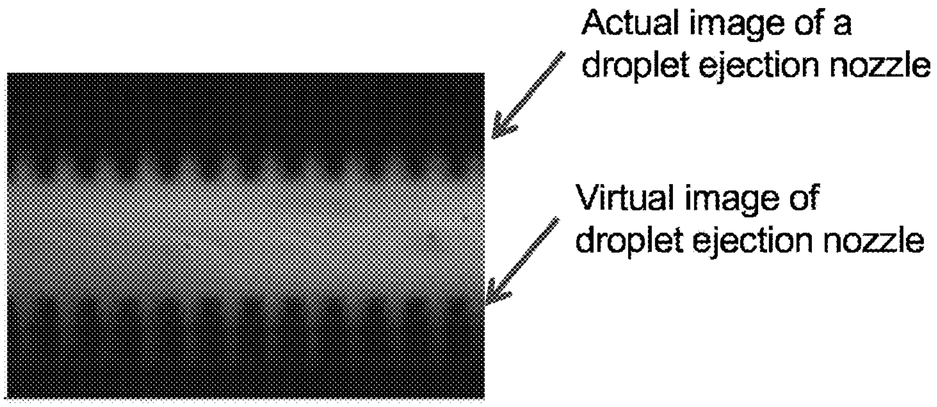
FIG. 13A is a diagram showing an image of a droplet ejection nozzle in a multi-nozzle head according to an embodiment of the present disclosure.
Figure 13B:
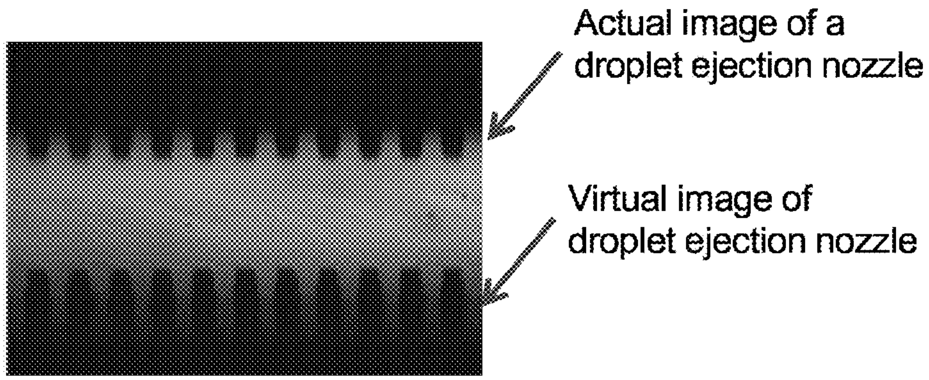
FIG. 13B is a diagram showing an image of a droplet ejection nozzle after adjustment in a multi-nozzle head according to an embodiment of the present disclosure.

FIG. 13A is an image of the multi-nozzle head 150 before adjustment captured by the inspection unit 160. FIG. 13B is an image when the inclination of the multi-nozzle head 150 is adjusted using the third adjusting unit 195. The third adjusting unit 195 rotates the multi-nozzle head 150 with respect to the third rotation shaft Ax3. As a result, the image of the droplet ejection nozzle which is out of focus in FIG. 13A can be brought into focus, as shown in FIG. 13B.

Figure 14A:
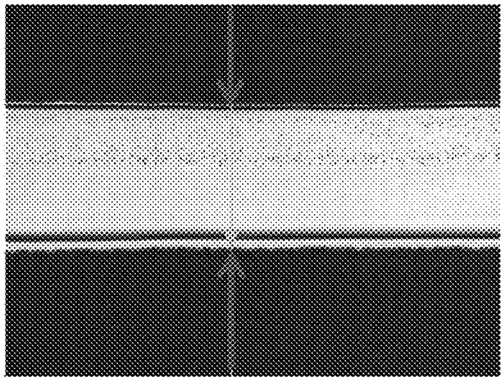
FIG. 14A is an image of the pattern formed by the multi-nozzle head 150 before adjustment.
Figure 14B:
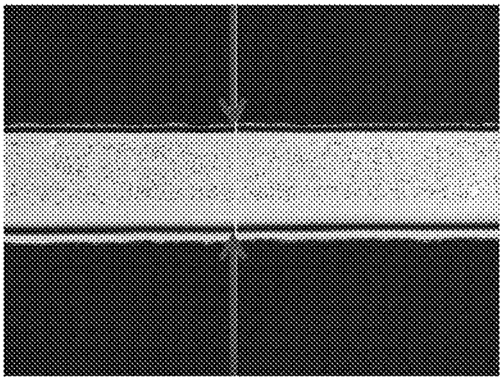
FIG. 14B is an image of a pattern formed by the multi-nozzle head 150 after adjusting the inclination of the multi-nozzle head using an adjusting unit.

FIG. 14A is an image of a pattern formed by the multi-nozzle head 150 before adjustment. FIG. 14B is an image when the inclination of the multi-nozzle head 150 is adjusted using the third adjusting unit 195. The third adjusting unit 195 rotates the multi-nozzle head 150 with respect to the third rotation shaft Ax3. As a result, it was confirmed that a pattern line width formed after the adjustment as shown in FIG. 14B (67.8 μm) became narrower than a pattern line width (81.9 μm) formed before the adjustment shown in FIG. 14A.

As described above, in the case where the replaceable multi-nozzle head is mounted, the multi-nozzle head (droplet ejection nozzle) can be adjusted to an appropriate position and orientation by using an embodiment of the present invention. As a result, droplets can be stably ejected using the replaceable multi-nozzle head.

Modification

Within the scope of the present invention, those skilled in the art can conceive of various modifications and examples, and it is understood that these modifications and examples also fall within the scope of the present invention. For example, a person skilled in the art appropriately adds, deletes, combines or changes the design of each embodiment, or adds, omits, or changes the conditions to the embodiments and such changes described above are included in the scope of the present invention as long as the gist of the present invention is included.

In the first embodiment of the present invention, although an example in which the inspection process and the adjustment process are performed at different timings has been described, the present invention is not limited thereto. The inspection process and the adjustment process may be performed simultaneously. Also, the inspection process and the determination process may also be performed simultaneously.

In the first embodiment of the present invention, although an example in which an imaging device is used as the inspection unit 160 has been described, the present invention is not limited thereto. The inspection unit 160 may be a displacement sensor or an inclination sensor, or a device capable of inspecting inclination information such as an angle sensor may be used as appropriate. A laser may be used for each sensor.

In the first embodiment of the present invention, although an example in which the inclination of the multi-nozzle head 150 mounted on the mounting unit 140 is adjusted has been described, the present invention is not limited thereto. For example, in the case where the multi-nozzle head 150 is used and the droplet ejection nozzle of the multi-nozzle head satisfies a predetermined condition, the control unit 110 may transmit replacement request information requesting the display unit 170 to replace the multi-nozzle head to the display unit 170. The predetermined condition in this case may be that the droplet ejection nozzle is closed, or may be an imaging result of the ejection pattern. As a result, a state of the multi-nozzle head can be detected, and the ejection failure of the droplet can be prevented.

In the first embodiment of the present invention, although an example in which the determination unit 117 determines whether or not the image of the tip 153*a* of the captured droplet ejection nozzle 153 is the same as the image of the tip 153*a* of the registered droplet ejection nozzle 153 is shown, the present invention is not limited thereto. For example, the inclination information of the tip 153*a* of the droplet ejection nozzle 153 may be converted into a numerical value. This makes it possible to more accurately adjust the inclination of the multi-nozzle.

In the first embodiment of the present invention, although an example in which the adjusting unit 190 adjusts the multi-nozzle head 150 when the user operates the operation unit 180 is shown, the present invention is not limited thereto. For example, the control unit 110 may transmit the instruction information to the adjusting unit 190 so that the multi-nozzle head 150 is arranged at the set inclination according to the inspection result. Accordingly, the inclination of the multi-nozzle head 150 can be automatically adjusted.

What is claimed is:

1. A droplet ejection device, comprising:

an ink supply unit configured to supply ink;

a replaceable multi-nozzle head arranged away from the ink supply unit and having a plurality of droplet ejection nozzles;

a mounting unit configured to mount the multi-nozzle head;

an inspection unit configured to inspect an inclination of the multi-nozzle head mounted on the mounting unit;

an adjusting unit configured to adjust the inclination of the multi-nozzle head based on an inspection result of the multi-nozzle head; and a power supply unit configured to apply a voltage to the multi-nozzle head such that droplets including the ink are ejected from the plurality of droplet ejection nozzles, wherein the inspection unit inspects an inclination of tips of the plurality of droplet ejection nozzles adjacent to each other among the multi-nozzle head, and wherein the adjusting unit adjusts the inclination of the tips of the plurality of droplet ejection nozzles.

2. The droplet ejection device according to claim 1, wherein the adjusting unit has a first adjusting unit configured to rotate the multi-nozzle head with respect to a first rotation shaft corresponding to a first direction parallel to an object, a second adjusting unit configured to rotate the multi-nozzle head with respect to a second rotation shaft corresponding to a second direction parallel to the object and intersecting the first direction, and a third adjusting unit configured to rotate the multi-nozzle head with respect to a third rotation shaft corresponding to a third direction perpendicular to the object and intersecting the first direction and the second direction.

3. The droplet ejection device according to claim 2, wherein the adjusting unit rotates the multi-nozzle head with respect to the third rotation shaft so that a line width of a pattern formed when droplets are ejected in a direction in which a plurality of droplet ejection nozzles are arranged satisfies a predetermined condition.

4. The droplet ejection device according to claim 2, comprising an operation unit operable by a user, wherein the adjusting unit rotates the multi-nozzle head with respect to at least one of the first rotation shaft, the second rotation shaft, and the third rotation shaft based on information input from the operation unit.

5. The droplet ejection device according to claim 2, further comprising a display unit configured to display information of the inspected multi-nozzle head, wherein the display unit displays information indicating that adjustment of an inclination of the multi-nozzle head is completed when a predetermined condition between first information of the inspected multi-nozzle head and second information registered in advance is satisfied.

6. The droplet ejection device according to claim 5, wherein the display unit displays replacement request information for requesting replacement of the multi-nozzle head when the droplet ejection nozzle of the multi-nozzle head satisfies a predetermined replacement condition.

7. An adjustment method for multi-nozzle head by a droplet ejection device, comprising:

providing a replaceable multi-nozzle head arranged away from an ink supply unit configured to supply ink, the multi-nozzle head having a plurality of droplet ejection nozzles;

inspecting an inclination of the multi-nozzle head when the multi-nozzle head is mounted on the mounting unit; and adjusting the inclination of the multi-nozzle head based on an inspection result of the multi-nozzle head, wherein the droplet ejection device includes a power supply unit configured to apply a voltage to the multi-nozzle head such that droplets are ejected from the plurality of droplet ejection nozzles, the method further comprising:

inspecting an indication of tips of the plurality of adjacent droplet ejection nozzles; and adjusting the inclination of the tips of the plurality of droplet ejection nozzles.

8. The adjustment method for multi-nozzle head by the droplet ejection device according to claim 7, further comprising:

rotating the multi-nozzle head with respect to a first rotation shaft corresponding to a first direction parallel to an object;

rotating the multi-nozzle head with respect to a second rotation shaft corresponding to a second direction parallel to the object and intersecting the first direction; and rotating the multi-nozzle head with respect to a third rotation shaft corresponding to a third direction perpendicular to the object and intersecting the first direction and the second direction.

9. The adjustment method for multi-nozzle head by the droplet ejection device according to claim 8, further comprising:

rotating the multi-nozzle head with respect to the third rotation shaft so that a line width of a pattern formed when the droplets are ejected in a direction in which the plurality of droplet ejection nozzles are arranged satisfies a predetermined condition.

10. The adjustment method for multi-nozzle head by the droplet ejection device according to claim 8, further comprising:

displaying first information of the inspected multi-nozzle head on a display unit; and displaying information indicating that adjustment of an inclination of the multi-nozzle head is completed on the display unit when a predetermined condition between the first information of the inspected multi-nozzle head and second information registered in advance is satisfied.

11. The adjustment method for multi-nozzle head by the droplet ejection device according to claim 10, further comprising:

displaying the replacement request information for requesting replacement of the multi-nozzle head on the display unit when the droplet ejection nozzle of the multi-nozzle head satisfies a predetermined replacement condition.

* * * * *